(12) United States Patent
Onuma et al.

(10) Patent No.: US 6,798,337 B2
(45) Date of Patent: Sep. 28, 2004

(54) VEHICULAR ELECTRONIC KEY SYSTEM

(75) Inventors: Yoshiki Onuma, Kanagawa (JP);
Teppei Nagano, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 321 days.

(21) Appl. No.: 09/822,362

(22) Filed: Apr. 2, 2001

(65) Prior Publication Data

US 2001/0026214 A1 Oct. 4, 2001

(30) Foreign Application Priority Data

| Apr. 3, 2000 | (JP) | ........................................ | 2000-100970 |
| Apr. 3, 2000 | (JP) | ........................................ | 2000-100971 |
| Mar. 9, 2001 | (JP) | ........................................ | 2001-066264 |
| Mar. 9, 2001 | (JP) | ........................................ | 2001-066265 |

(51) Int. Cl.⁷ ........................ B60R 25/00; G08C 19/00; H04Q 9/00; E05F 15/10
(52) U.S. Cl. ........................ 340/5.72; 340/5.61; 49/26
(58) Field of Search .............................. 340/5.72, 5.61; 49/26

(56) References Cited

U.S. PATENT DOCUMENTS

| 4,835,533 | A | * | 5/1989 | Akutsu ........................ 340/5.3 |
| 4,860,002 | A | * | 8/1989 | Imaizumi et al. .......... 340/5.64 |
| 4,965,460 | A | * | 10/1990 | Tanaka et al. .............. 307/10.2 |
| 5,157,389 | A | * | 10/1992 | Kurozu et al. ................ 340/5.3 |
| 5,293,160 | A | * | 3/1994 | Kurozu et al. ................ 340/5.3 |
| 5,767,784 | A | * | 6/1998 | Khamharn .................. 340/5.23 |
| 5,917,405 | A | * | 6/1999 | Joao ...................... 340/426.17 |
| 6,075,545 | A | * | 6/2000 | De Bonet et al. ........... 345/571 |
| 6,194,997 | B1 | * | 2/2001 | Buchner et al. ....... 340/426.26 |

FOREIGN PATENT DOCUMENTS

| DE | 197 11 901 | 8/1998 |
| DE | 198 33 451 | 8/1999 |
| EP | 0 426 114 | 5/1991 |
| EP | 0 523 602 | 1/1993 |
| JP | 60-119876 | 6/1985 |
| JP | 60-164571 | 8/1985 |
| JP | 2511202 | 7/1996 |
| JP | 9-132114 | 5/1997 |

* cited by examiner

Primary Examiner—Michael Horabik
Assistant Examiner—Scott D Au
(74) Attorney, Agent, or Firm—McDermott Will & Emery LLP

(57) ABSTRACT

A vehicular electronic key system includes an on-vehicle apparatus which is communicable with an electronic key when the electronic key is in a predetermined area outside of a vehicle. The on-vehicle apparatus generates alarm when a door lock operation is executed from the outside of the vehicle and when the on-vehicle apparatus is not capable of communicating with the electronic key. Further, on-vehicle apparatus generates alarm when a key ID does not corresponds with an apparatus ID. Therefore, the electronic key system can firmly prevent the electronic key from being mislaid in the vehicle.

11 Claims, 8 Drawing Sheets

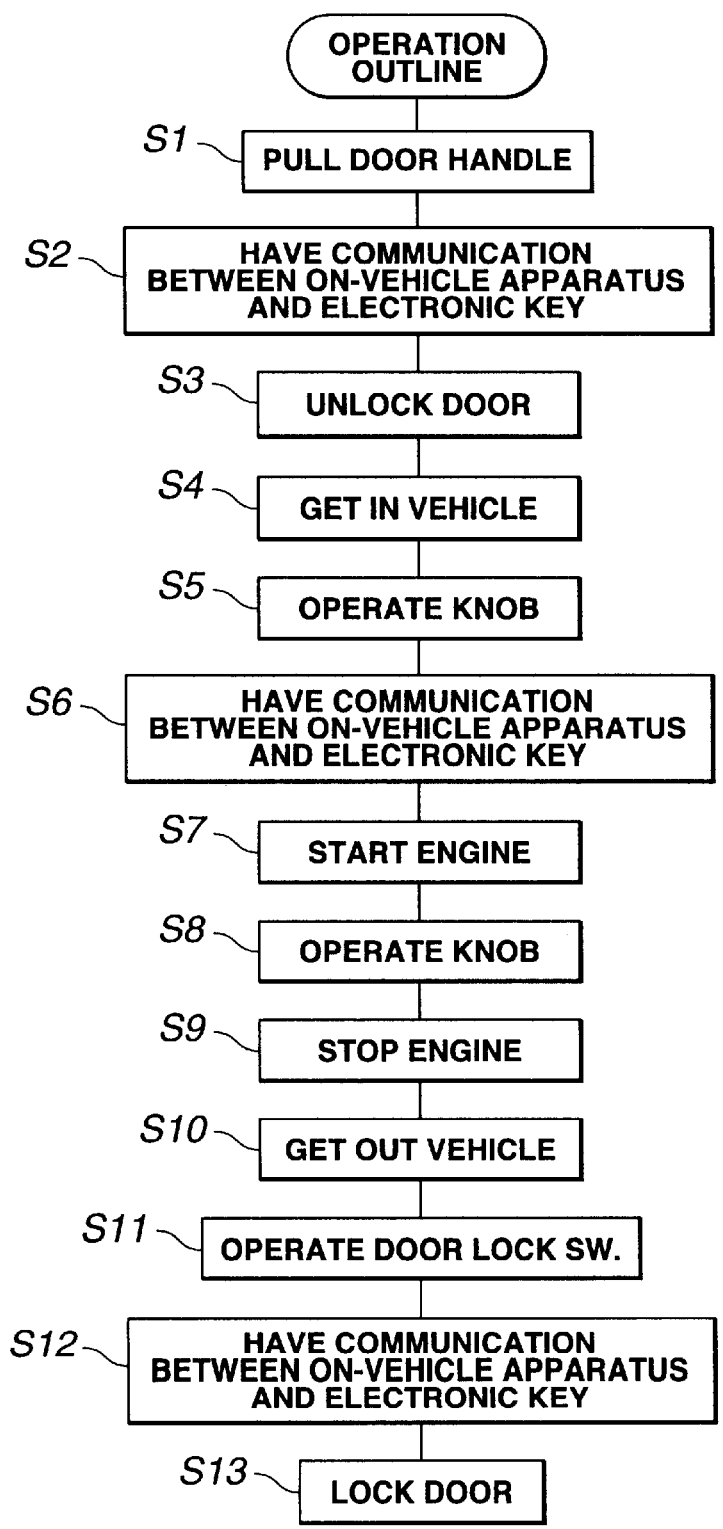

VEHICULAR ELECTRONIC KEY SYSTEM

BACKGROUND OF THE INVENTION

The present invention relates to a vehicular electronic key system for unlocking/locking vehicular doors and starting an engine. The electronic key system includes an electronic key and an on-vehicle apparatus which is communicable with the electronic key by means of wireless communication, and identifies ID (identification data) between the electronic key and the on-vehicle apparatus to permit the door unlocking/locking operation and the engine starting operation.

A Japanese Utility Model Provisional Registered No. 2511202 discloses a vehicular electronic key system arranged to warn a driver that an electronic key has been mislaid in a passenger compartment when the driver opened a driver door.

SUMMARY OF THE INVENTION

However, such a vehicular electronic key system requires a large magnetic field generator or a plurality of small magnetic field generators, which can form a magnetic field in a vehicle passenger compartment, so that the system can detect an electronic key mislaid in a passenger compartment. This provision of such a large magnet field generator or plurality of small magnetic field generators increases energy consumption of a vehicle.

It is therefore an object of the present invention to provide an electronic key system which is capable of preventing a driver from mislaying an electronic key in a passenger compartment by employing a necessary minimum numbers of small antennas.

An electronic key system according to the present invention is for a vehicle and comprises a portable apparatus and an on-vehicle apparatus. The portable apparatus comprises a first wireless communication device and a first memory storing a key ID (Identification Data). The on-vehicle apparatus is installed in the vehicle and comprises a second wireless communication device, a second memory storing an apparatus ID, a door condition detector, and a control unit. The second wireless communication device is communicable with the first wireless communicating device when the first wireless communication device is located in a predetermined area outside of the vehicle. The door condition detector detects that a locking operation of the vehicle door is executed from the outside of the vehicle. The control unit locks the vehicle door when the key ID corresponds with the apparatus ID. The control unit outputs alarm when the locking operation of the vehicle door is executed from the outside of the vehicle and when the second wireless communication device is not capable of communicating with the first wireless communicating device.

BRIEF DESCRIPTION OF THE DRAWINGS

FIG. 6 is a flowchart showing an outline of operation of the on-vehicle apparatus, the electronic key and a driver according to the first embodiment of the present invention.

DETAILED DESCRIPTION OF THE INVENTION

Referring to FIGS. 1 to 7B, there is shown a first embodiment of a vehicular electronic key system according to the present invention.

Figure 1:
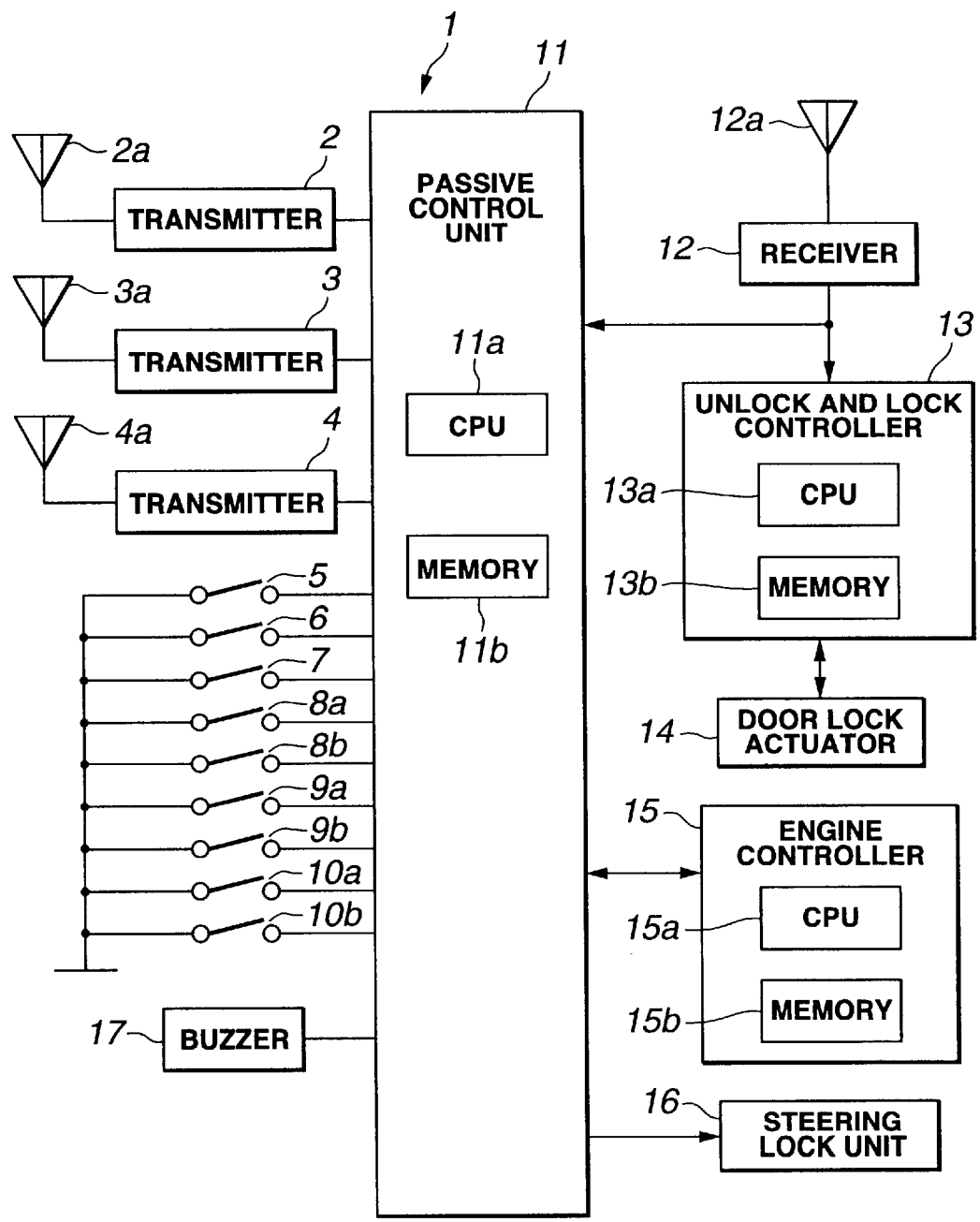
FIG. 1 is a schematic view showing an on-vehicle apparatus of an electronic key system according to an embodiment of the present invention.
Figure 2:
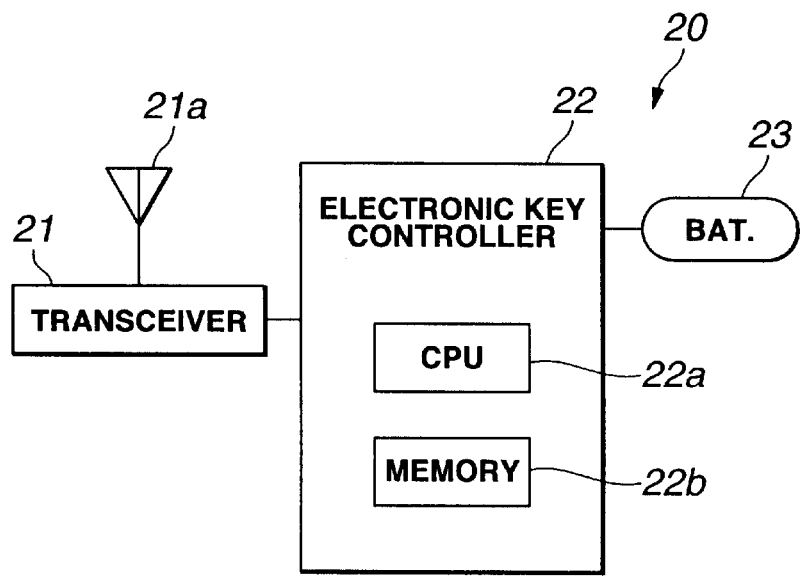
FIG. 2 is a schematic view showing an electronic key of the electronic key system.
Figure 3:
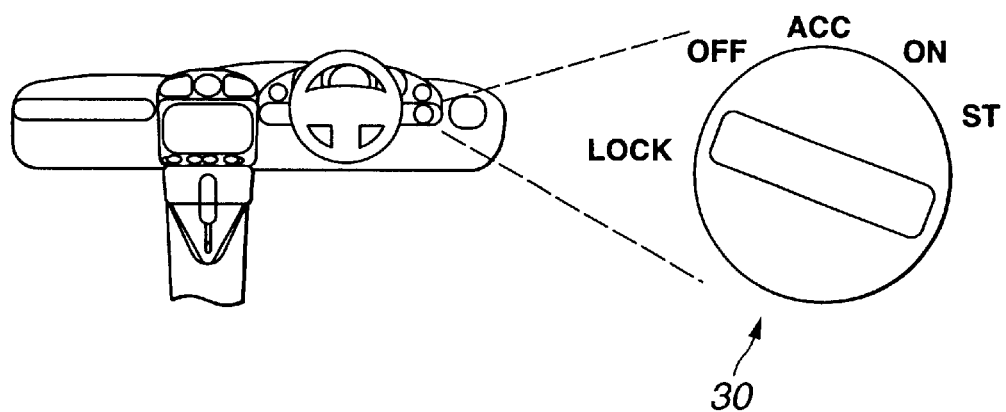
FIG. 3 is a view showing an ignition knob and an installed portion thereof in an instrument panel of a vehicle according to the embodiment of the present invention.

Vehicular electronic key system comprises an on-vehicle apparatus 1 shown in FIG. 1, an electronic key 20 shown in FIG. 2 and an ignition switch operated by an ignition knob 30 shown in FIG. 3.

As shown in FIG. 1, on-vehicle apparatus 1 of the vehicular electronic key system comprises passive control unit 11, first, second and third transmitters 2, 3 and 4, a receiver 12, an unlock and lock controller 13, an engine controller 15, a steering lock unit 16 and a buzzer 17. Unlock and lock controller 13 is connected to a door lock actuator 14 through which vehicular doors are opened and closed. Further, on-vehicle apparatus 1 is connected to various switches as explained later.

As shown in FIG. 2, electronic key 20 comprises a transceiver 21, an electronic key controller 22 and a battery 23. Electronic key controller 22 comprises a CPU 22a and a nonvolatile memory 22b of a peripheral equipment. Electronic key 20 executes radio communication with on-vehicle apparatus 1 through an antenna 21a of transceiver 21. Nonvolatile memory 22b stores ID (Identification Data) for identifying a person having electronic key 20 as a permitted driver. Battery 23 is exchangeable and supplies electric power to electronic key controller 22.

Electronic key 20 has no key plate employed in a conventional ignition key and is formed into a card which is further portable for a driver as compared with a conventional key. No cylinder unit for receiving electronic key 20 is provided in on-vehicle apparatus 1. It is not necessary for the driver to set electronic key 20 at a predetermined position, and the driver may merely carry electronic key 20. Ignition knob 30 is installed on an instrument panel in a passenger compartment of the vehicle as shown in FIG. 3, and no key hole is provided thereto since it is not necessary to insert electronic key 20 to the ignition switch unit.

The ignition switch unit (not-shown) operated by ignition knob 30 is connected to passive control unit 11 and comprises a key switch 5, ignition-on switch 6, an engine start switch 7, and a steering lock unit 16 for locking a steering wheel. Ignition knob 30 is manually operated by the driver carrying electronic key 30. Steering lock unit 16 comprises a turn inhibiting latch (not shown) for inhibiting the turning of ignition knob 30 by locking ignition knob 30. Accordingly, by putting this turn inhibiting latch in a turnable state, ignition knob 30 and the steering wheel are put in the turnable state.

By pushing ignition knob 30 set at a steering lock position denoted by LOCK in FIG. 3, key switch 5 is switched on. Further, by turning ignition knob 30 to an ignition-on position denoted by ON in FIG. 3, ignition-on switch 6 is switched on. By further turning ignition knob 30 to an engine start position denoted by START in FIG. 3, engine start switch 7 is switched on.

Figure 4:
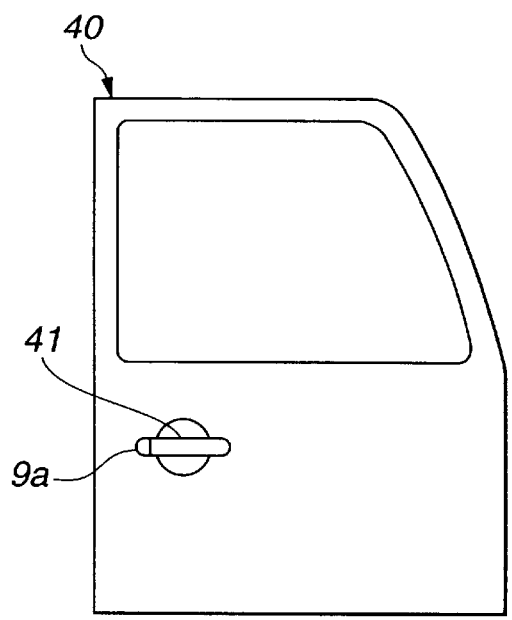
FIG. 4 is a view showing a driver door according to the embodiment of the present invention.

Door handle switches 8a and 8b for detecting the operation of door handles of driver and assistant doors 40 and 43 are installed to driver and assistant doors 40 and 43, respectively, and are connected to passive controller 11 in order to start a door unlock process as to doors 40 and 43 for front vehicle occupants. That is, each of door handle switches 8a and 8b is switched on when the door handle of each of doors 40 and 43 is operated to open each of doors 40 and 43. Door lock switches 9a and 9b for detecting whether doors 40 and 43 are locked or not are installed to doors 40 and 43 and connected to passive controller 11 in order to start a door lock process as to the doors for front seats. As shown in FIG. 4, door lock switch 9a is installed at a portion near a door outside handle 41 for a driver door 40 and is operated from the outside of the vehicle when driver door 40 is locked. As is similar to door lock switch 9a, door lock switch 9b is installed at a portion near a door outside handle 41 for an assistant (front passenger) door 43. Door lock condition switches 10a and 10b are switches for detecting whether driver door 40 and assistant door 43 are locked or unlocked, respectively. Each of door lock condition switches 10a and 10b is switched off when a door lock mechanism (not shown) for each of front doors 40 and 43 is put in a lock condition, and is switched on when the door lock mechanism is put in an unlock condition.

On-vehicle apparatus 1 communicates with electronic key 20 through first, second and third transmitters 2, 3 and 4 and a receiver 12 by means of wireless communication. First transmitter 2 is installed at the driver seat or a ceiling above the drive seat. First transmitter 2 sends an engine start signal to electronic key 20 through an antenna 2a. By controlling the directivity of antenna 2a, a communicable area between on-vehicle apparatus 1 and electronic key 20 is limited within an area of a passenger compartment near the driver seat. The communicable area may be limited in an area where first transmitter 2 can send the signal to electronic key 20 carried by a driver seated on the driver seat.

Figure 5:
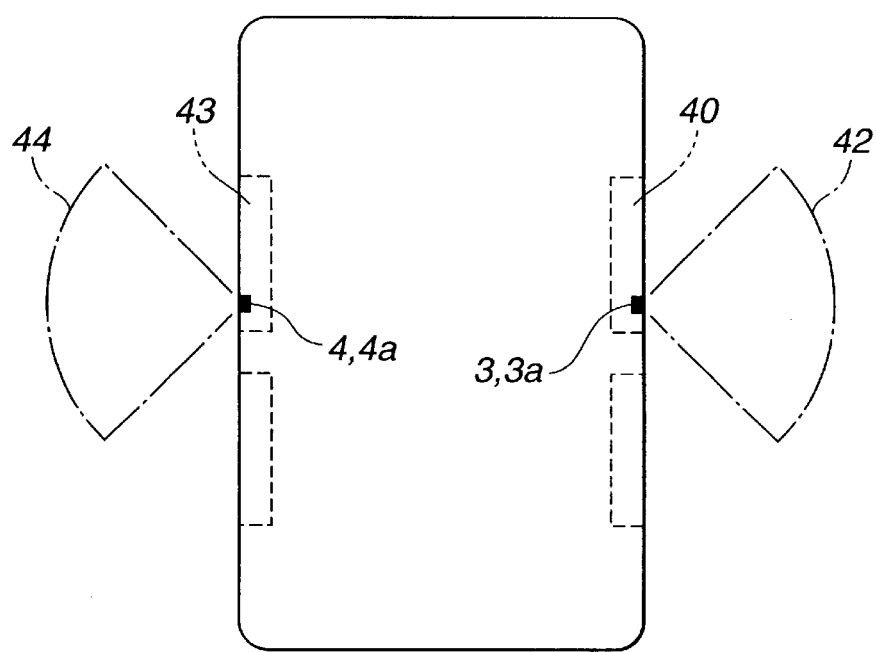
FIG. 5 is a top view showing communicable areas of door antennas installed near doors according to the embodiment of the present invention.

As shown in FIG. 5, second transmitter 3 is installed in the vicinity of door outside handle 41 of driver door 40 and sends a door lock signal and a door unlock signal through a driver-door antenna 3a to electronic key 20 carried by the driver who is found near driver door 40. By controlling the directivity of driver-door antenna 3a, the communicable area between on-vehicle apparatus 1 and electronic key 20 is limited within an area 42 of an outside near driver door 40 as shown in FIG. 5. The communicable area 42 may be limited in an area where second transmitter 3 can send the signal to electronic key 20 carried by a driver who will execute a door lock by operating door lock switch 9a.

Similarly, third transmitter 4 is installed in the vicinity of door outside handle 41 of assistant door 43 and sends a door lock signal and a door unlock signal through an assistant-door antenna 4a to electronic key 20 carried by the driver who is found-near assistant door 43. By controlling the directivity of assistant-door antenna 4a, a communicable area between on-vehicle apparatus 1 and electronic key 20 is limited within an area 44 of an outside near assistant door 43. The communicable area 44 may be limited in a range where third transmitter 4 can send the signal to electronic key 20 carried by a vehicle occupant who will execute a door lock by operating door lock switch 9b.

Receiver 12 is installed at a rear parcel located at a vehicle rear portion, and receives an engine start request signal, a lock request signal, an unlock request signal and the key ID from electronic key 20 through an antenna 12a. Unlock and lock controller 13 comprises a CPU 13a and a nonvolatile memory 13b and executes locking and unlocking operations of driver door 40, assistant door 43, rear-passenger doors by controlling door lock actuator 14. Engine controller 15 comprises a CPU 15a and a nonvolatile memory 15b and controls an engine speed and an output torque of an engine by controlling a throttle valve control apparatus, a fuel injection apparatus and an ignition apparatus executes locking and unlocking operations of driver door 40, assistant door 43, the rear-passenger doors by controlling door lock actuator 14.

Passive control unit 11 comprises a CPU 11a and a nonvolatile memory 11b, and executes the door unlocking and locking operations and the engine starting and stopping operations through radio communication with electronic key 20 via transmitters 2, 3 and 4 and receiver 12. More specifically, passive control unit 11 executes the door unlocking and locking operations and the engine starting and stopping operations in a manner of controlling unlock and lock controller 13 and engine controller 15 according to the set conditions of ignition switches 5 to 7, door handle switches 8a and 8b, door lock switches 9a and 9b, and lock condition switches 10a and 10b.

A buzzer 17 is connected to passive control unit 11 in order to warn that electronic key 20 is mislaid in the vehicle, and is installed at a position from which a vehicle occupant outside of the vehicle can hear the alarm of buzzer 17. It is certain that a speaker may be provided instead of buzzer 7 and may inform the alarm condition to the vehicle occupant by voice.

Figure 7A:
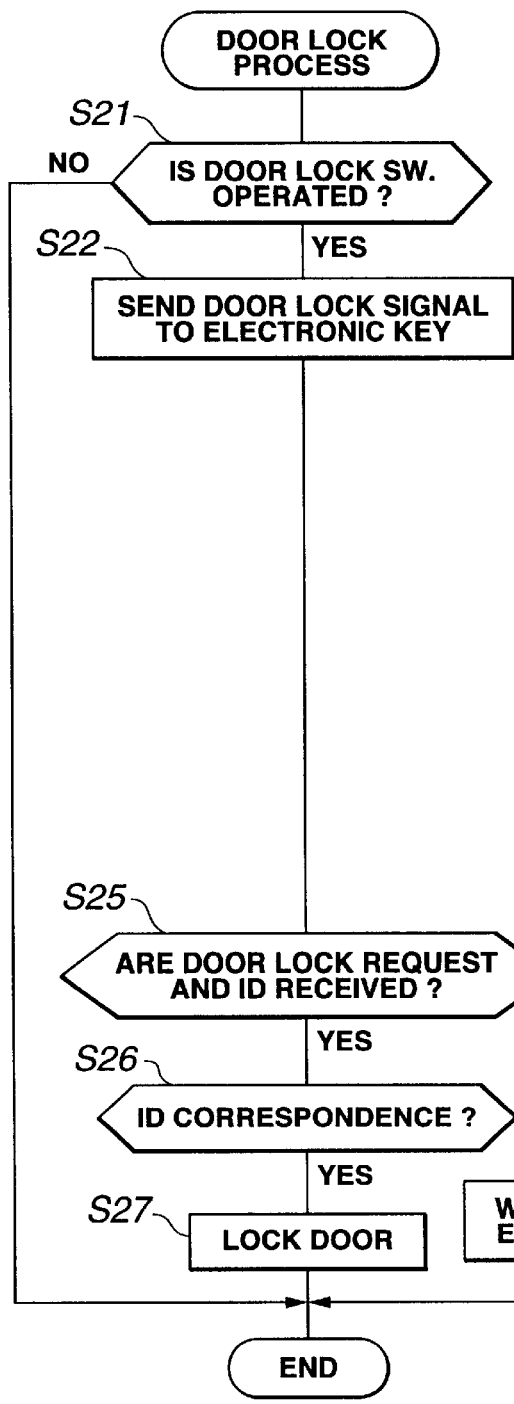
FIG. 7A is a flowchart showing a door lock process executed by the on-vehicle apparatus.

Next, there will be discussed operations which are executed by on-vehicle apparatus 1, electronic key 20 and a driver in the first embodiment according to the present invention, with reference to FIGS. 6, 7A and 7B. A flowchart of FIG. 6 schematically shows a procedure of the door unlock process, the engine start process and the door lock process in the first embodiment. First, the procedure of these processes will be schematically discussed in time series with reference to FIG. 6.

First, when a driver or an assistant pulls a door outside handle to open driver door 40 or assistant door 43, on-vehicle apparatus 1 checks at step S1 whether one of door handle switches 8a and 8b is switched on. When one of door handle switches 8a and 8b is switched on, the routine proceeds to step S2.

At step S2, on-vehicle apparatus 1 communicates with electronic key 20 to send and receive information as to the door unlock operation. More specifically, on-vehicle apparatus 1 sends a door unlock signal to electronic key 20 through one of second transmitter 3 having antenna 3a and third transmitter 4 having antenna 4a. In reply to this signal, electronic key 20 sends an unlock request signal and the key ID to on-vehicle apparatus 1.

At step S3, on-vehicle apparatus 1 decides whether the key ID sent from electronic key 20 corresponds with the apparatus ID stored in memory 13b, and unlocks doors 40 and 43 when the key ID sent from electronic key 20 corresponds with the apparatus ID. More specifically, unlock and lock controller 13 of on-vehicle apparatus 1 receives the unlock request signal and the key ID from electronic key 20 through receiver 12, and identifies the received key ID with the registered ID stored in memory 13b. When the key ID corresponds with the apparatus ID stored in memory 13b, on-vehicle apparatus 1 unlocks doors 40 and 43 in a manner that unlock and lock controller 13 controls door lock actuator 14.

Next, the driver gets in the vehicle and operates ignition knob 30 at steps S4 and S5.

At step S6, on-vehicle apparatus 1 communicates with electronic key 20 to send and receive information as to the engine start operation. More specifically, an engine start signal is sent from on-vehicle apparatus 1 to electronic key 20 through first transmitter 2 having antenna 2a. In reply to this signal, electronic key 20 sends an engine start request signal and the key ID for starting the engine to on-vehicle apparatus 1. On-vehicle apparatus 1 identifies the key ID for starting the engine with the registered ID for starting the engine.

At step S7, the engine is started in reply to the correspondence result between the received key ID for starting the engine and the registered ID for starting the engine.

Thereafter, the driver terminates a driving of the vehicle and operates ignition knob 30 to start stopping the engine at step S8. In reply to this operation of ignition knob 30, at step S9 on-vehicle apparatus 1 stops the engine by controlling engine controller 15.

Then, the driver gets out the vehicle at step S10, and closes and locks driver door 40 or assistant door 43 from the outside of the vehicle at step S11. In reply to this door locking operation, door lock switches 9a and 9b are switched on.

At step S12, on-vehicle apparatus 1 communicates with electronic key 20 to send and receive information as to the door lock operation. More specifically, a door lock signal is sent from on-vehicle apparatus 1 to electronic key 20 through one of second and third transmitters 3 and 4. In reply to this signal, electronic key 20 sends an unlock request signal and the key ID to on-vehicle apparatus 1 through transceiver 21.

At step S13, on-vehicle apparatus 1 decides whether the key ID for locking doors 40 and 43 corresponds with the apparatus ID stored in memory 13b. More specifically, unlock and lock controller 13 of on-vehicle apparatus 1 receives the lock request signal and the key ID from electronic key 20 through receiver 12 and transceiver 21, and identifies the key ID with the registered ID stored in memory 13b. When the sent key ID corresponds with the apparatus ID stored in memory 13b, on-vehicle apparatus 1 locks doors 40 and 43 in a manner that unlock and lock controller 13 controls door lock actuator 14.

Next, with reference to FIGS. 7A and 7b, the door lock process will be discussed in detail.

At step S21, on-vehicle apparatus 1 decides whether each of door lock switch 9a of driver door 40 and door lock switch 9b of assistant door 43 is switched on by the driver or other vehicle occupant from the outside of the vehicle. Since each of door lock switches 9a and 9b is installed on an outside surface of door 40, 43, on-vehicle apparatus 1 decides that a vehicle occupant outside of the vehicle is executing the door locking operation when one of door lock switches 9a and 9b is switched on. When the door lock operation is executed, that is, when one of door lock switches 9a and 9b is switched on, the routine proceeds to step S22. When neither door lock switch 9a nor 9b is not switched on, the routine jumps to an end step to terminate the present routing without locking the doors 40 and 43.

At step S22, on-vehicle apparatus 1 sends the door lock signal to electronic key 20 through second transmitter 3 and antenna 3a provided in driver door 40 in reply to the operation of door lock switch 9a of driver door 40. Further, in reply to the operation of door lock switch 9b of assistant door 43, on-vehicle apparatus 1 sends the door lock signal to electronic key 20 through third transmitter 4 and antenna 4a provided in assistant door 43.

Figure 7B:
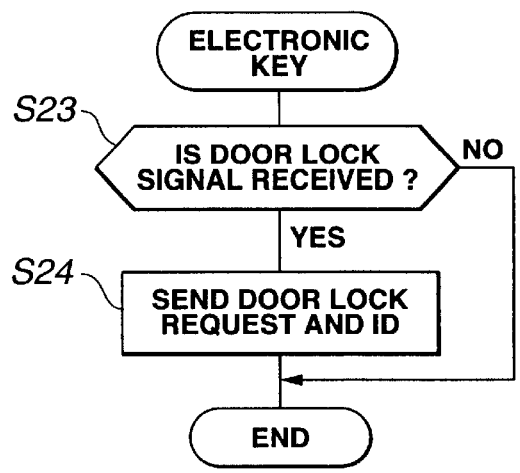
FIG. 7B is a flowchart showing a door locking process executed by the electronic key in connection with the on-vehicle apparatus, in the first embodiment.

As shown in FIG. 7B, electronic key 20 starts awaiting the door lock signal outputted from on-vehicle apparatus 1, in reply to the start of this door lock process.

At step S23, electronic key 20 decides whether the door lock signal is received. When electronic key 20 receives the door lock signal from on-vehicle apparatus 1, the routine proceeds to step S24 wherein electronic key 20 outputs the door lock request signal and the key ID to on-vehicle apparatus 1.

As described above, driver-door communicable area 42 is an area where on-vehicle apparatus 1 are communicable with electronic key 20 through driver-door antenna 3a and electronic key antenna 21a and is set outside of the vehicle and near driver door 40. Similarly, assistant-door communicable area 44 is an area where on-vehicle apparatus 1 are communicable with electronic key 20 through assistant door antenna 4a and electronic key antenna 21a and is set outside of the vehicle and near assistant door 40. Therefore, only when a vehicle occupant having electronic key 20 is found outside of the vehicle and near driver door 40 or outside of the vehicle and near assistant door 43, wireless communication is established between on-vehicle apparatus 1 and electronic key 20. Accordingly, it can be decided that the vehicle occupant carries electronic key 20 and has not mislaid electronic key 20 in the vehicle when on-vehicle apparatus 1 is communicable with electronic key 20 by means of wireless communication.

At step S25, on-vehicle apparatus 1 checks for a predetermined time period whether receiver 12 receives the door lock request signal and the key ID from electronic key 20 through antenna 12a. When the door lock request signal and the key ID signal are received, the routine proceeds to step S26. When receiver 12 does not receive the door lock request and the key ID within the predetermined time period, the routine proceeds to step S28.

At step S26, on-vehicle apparatus 1 checks whether the key ID sent from electronic key 20 corresponds with the registered key ID. When the key ID sent from electronic key 20 corresponds with the registered ID stored in memory 11b, the routine proceeds to step S27. When the key ID does not correspond with the registered apparatus ID, the routine proceeds to step S28.

At step S27, on-vehicle apparatus 1 executes the locking of both doors 40 and 43 by controlling door lock actuator 14 through unlock and lock controller 13.

At step S28 following to the negative decision at step S25 or S26, that is, when it is decided that on-vehicle apparatus 1 does not receive the door lock request and the key ID from electronic key 20 or that the key ID does not correspond with the apparatus ID, on-vehicle apparatus 1 generates alarm by means of buzzer 17 to inform the vehicle occupant that electronic key 20 has been mislaid in a passenger compartment of the vehicle. Further, on-vehicle apparatus 1 inhibits the locking of doors 40 and 43 and terminates the present routine of the door lock process.

Figure 8:
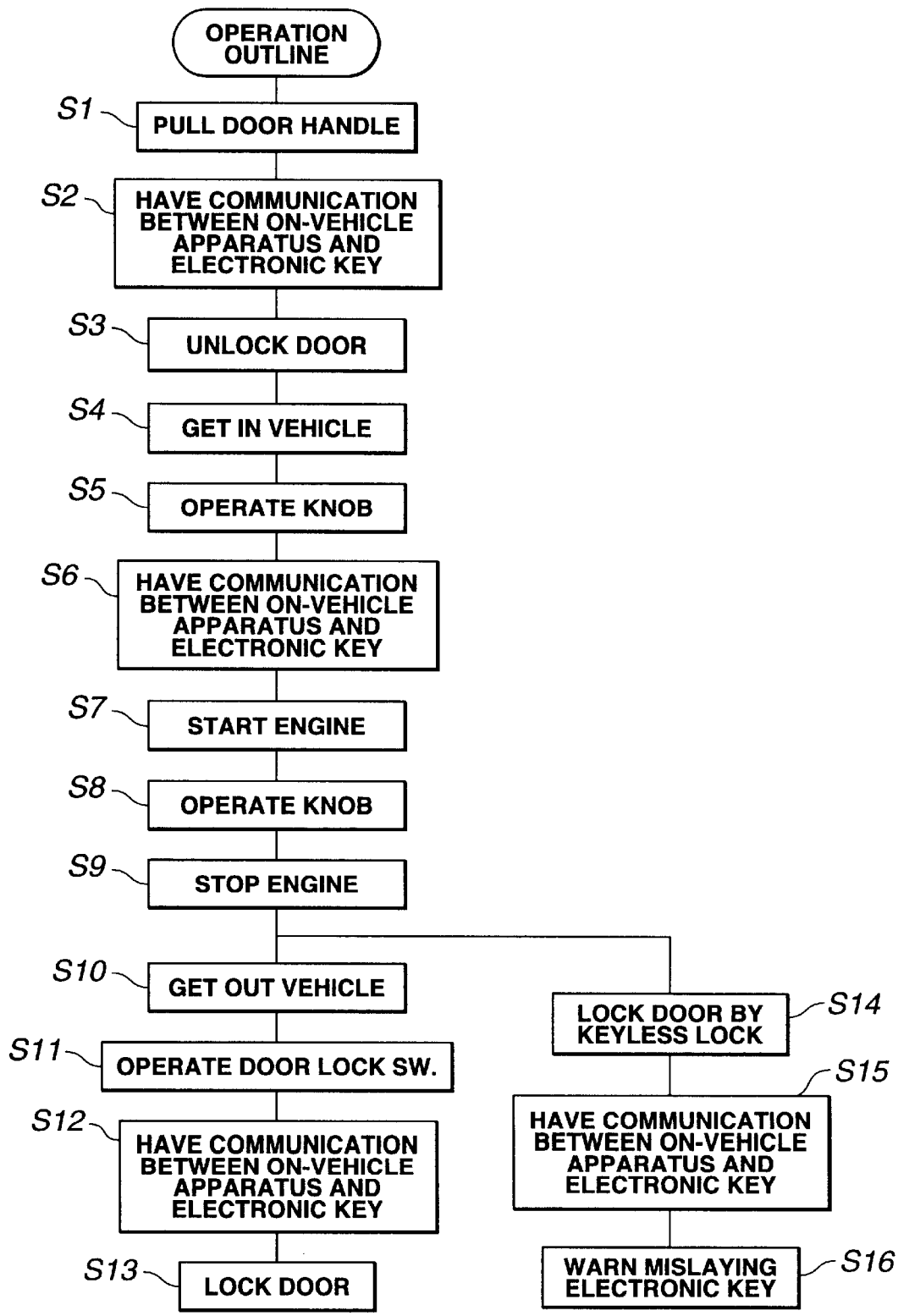
FIG. 8 is a flowchart showing an outline of operation of the on-vehicle apparatus, the electronic key and a driver according to a second embodiment of the present invention.
Figure 9A:
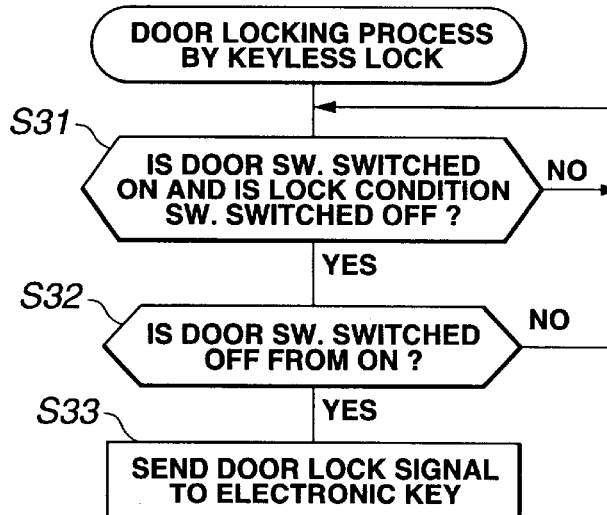
FIG. 9A is a flowchart showing a part of the door locking process executed by the on-vehicle apparatus in the second embodiment.
Figure 9B:
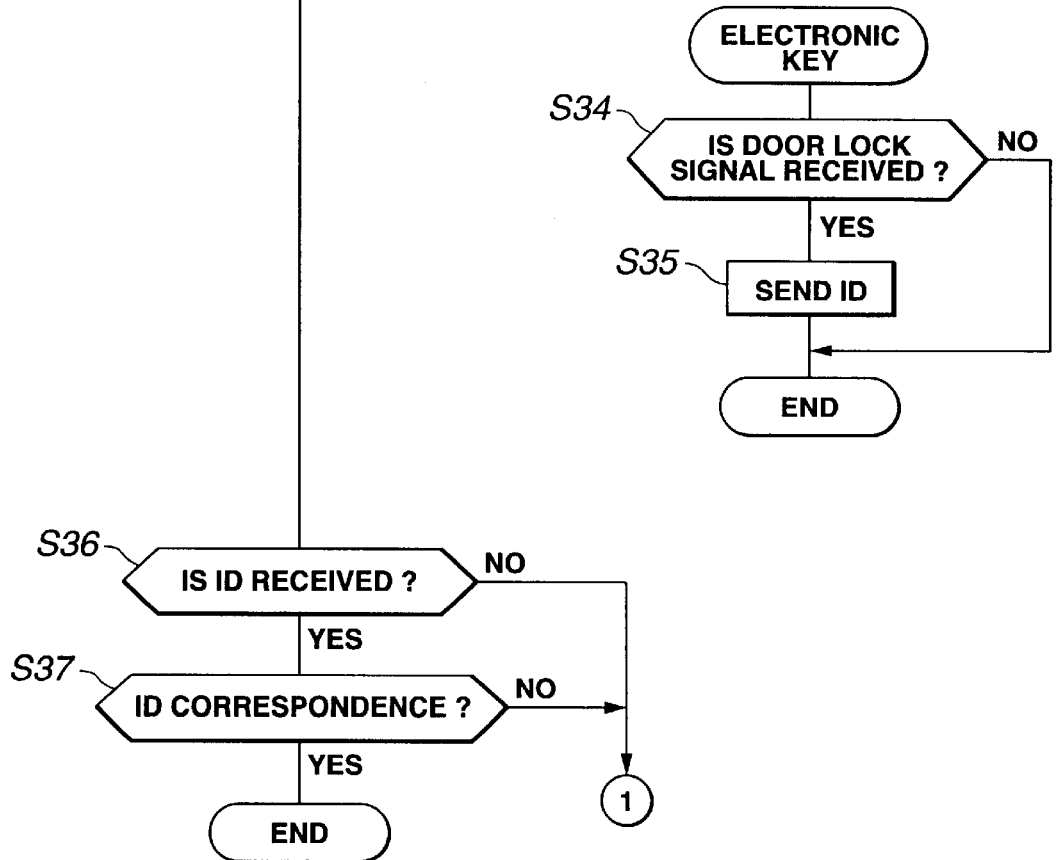
FIG. 9B is a flowchart showing a part of the door locking process executed by the electronic key in connection with the on-vehicle apparatus in accordance with the second embodiment.
Figure 10:
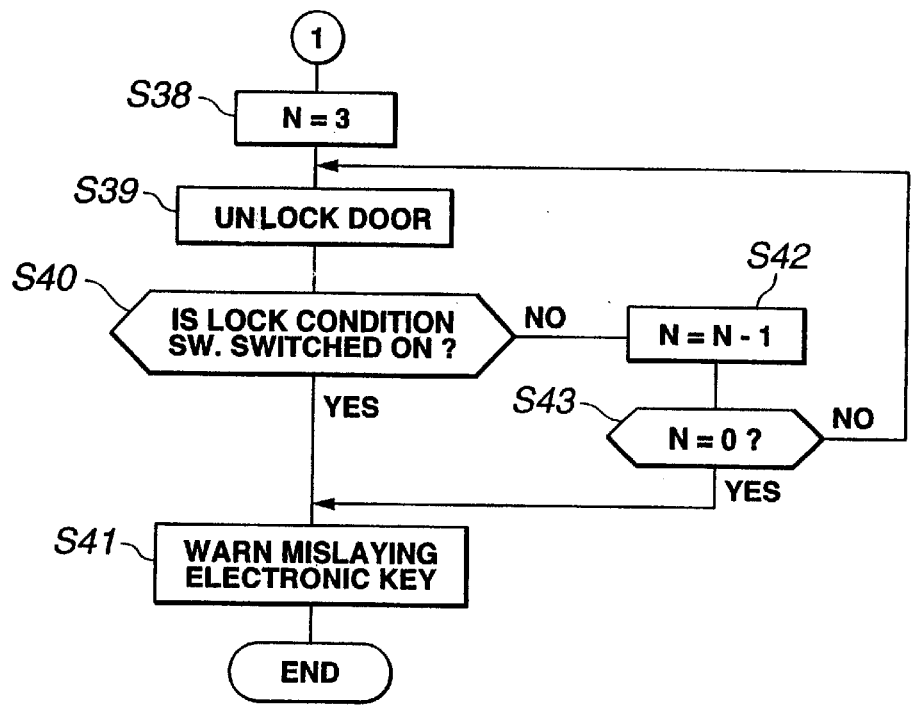
FIG. 10 is a flowchart showing another part of the door locking process executed by the on-vehicle apparatus according to the second embodiment.

Referring to FIGS. 8 to 10, there is shown a second embodiment of the electronic key system according to the present invention.

A hardware construction of the second embodiment is the same as that of the first embodiment shown in FIGS. 1 to 5, and therefore the explanation thereof is omitted herein. Only the manner of operation of the second embodiment according to the present invention will be discussed hereinafter with reference to FIGS. 8 to 10.

The operations executed in the second embodiment further takes account of a so-called keyless lock, in addition to the operations of the first embodiment shown in FIG. 6. The keyless lock of doors is executed with no key in a manner that a driver puts a lock mechanism of doors 40 and 43 in a lock condition by operating a door knob of opened door 40 or an integrated door lock switch and closes driver door 40 while pulling the door outside handle.

As shown in FIG. 8, steps S1 to S13 are completely the same as those of the first embodiment shown in FIG. 6, and therefore the explanations of steps S1 to S13 are omitted herein. Only steps S14 to S16 relating to the keyless lock will be discussed hereinafter.

Following to the engine stop at step S9, a driver may execute the door lock process without using electronic key 20. More specifically, the driver may lock driver door 40 and other doors by means of the keyless lock by directly operating the door lock switch and door outside handle. In such a case, the operations in the flowchart of FIG. 8 proceeds to step S14.

At step S14, the driver executes the keyless lock of doors in a manner that the driver puts a lock mechanism of driver door 40 in the lock condition by operating a door knob of opened door 40 or an integrated door lock switch and closes driver door 40 while pulling the door outside handle.

At step S15 following to the door lock operation at step S14, on-vehicle apparatus 1 executes to communicate with electronic key 20 and checks whether electronic key 20 is mislaid in the vehicle compartment or not. When on-vehicle apparatus 1 cannot communicate with electronic key 20 or when the key ID does not correspond with the apparatus ID though on-vehicle apparatus 1 can communicate with electronic key 20, on-vehicle apparatus 1 decides that the driver has mislaid electronic key 20 in the vehicle.

At step S16, on-vehicle apparatus 1 unlocks doors and warn the driver that electronic key 20 has been mislaid in the vehicle.

Next, with reference to FIGS. 9A, 9B and 10, the door lock process shown by step S14 to S16 in FIG. 8 will be discussed in detail hereinafter.

On-vehicle apparatus 1 decides whether the keyless lock was executed by operating driver door 40 or assistant door 43 through the execution of steps S31 and S32 of FIG. 9A. More specifically, at step S31 on-vehicle apparatus 1 checks whether driver-door handle switch 8a is put in ON state and whether door lock condition switch 10a is put in OFF state. That is, on-vehicle apparatus 1 checks whether the door lock mechanism of driver door 40 is put in the lock condition as a result of the keyless lock of operating the door lock knob or integrated door lock switch under the door open condition. Further, on-vehicle apparatus 1 checks whether the door lock mechanism of assistant door 43 is put in the lock condition as a result of the keyless lock of operating the door lock knob or integrated door lock switch under the door open condition. When on-vehicle apparatus 1 decides that driver door 40 or assistant door 43 was locked while being opened, the routine proceeds to step S32. When the decision at step S31 is negative, the routine repeats step S31 for a predetermined time period.

At step S32, on-vehicle apparatus 1 decides whether one of door handle switches 8a and 8b has been just switched off from ON condition. That is, on-vehicle apparatus 1 checks whether driver door 40 or assistant door 43 has just been closed. When the decision at step S32 is affirmative, that is, when driver door 40 or assistant door 43 is locked by means of the keyless lock, the routine proceeds to step S33. When the decision at step S32 is negative, the routine returns to step S31.

At step S33, on-vehicle apparatus 1 sends the door lock signal to electronic key 20 through first transmitter 3 and driver-door antenna 3a of driver door 40 when driver door 40 is locked by means of the keyless lock, and sends the door lock signal to electronic key 20 through second transmitter 4 and assistant-door antenna 4a when assistant door 43 is locked by means of the keyless lock.

As shown in FIG. 9B, electronic key 20 starts awaiting the door lock signal outputted from on-vehicle apparatus 1, in reply to the start of this door lock process of FIGS. 9A, 9B and 10.

At step S34, electronic key 20 decides whether the door lock signal is received. When electronic key 20 receives the door lock signal from on-vehicle apparatus 1, the routine proceeds to step S35 wherein electronic key 20 outputs the key ID to on-vehicle apparatus 1.

As described above, driver-door communicable area 42 is an area where on-vehicle apparatus 1 are communicable with electronic key 20 through driver-door antenna 3a and electronic key antenna 21a and is set outside of the vehicle and near driver door 40. Similarly, assistant-door communicable area 44 is an area where on-vehicle apparatus 1 are communicable with electronic key 20 through assistant-door antenna 4a and electronic key antenna 21a and is set outside of the vehicle and near assistant door 43. Therefore, only when a vehicle occupant having electronic key 20 is found outside of the vehicle and near driver door 40 or outside of the vehicle and near assistant door 43, wireless communication is established between on-vehicle apparatus 1 and electronic key 20. Accordingly, it can be decided that the vehicle occupant carries electronic key 20 and has not mislaid electronic key 20 in the vehicle when on-vehicle apparatus 1 is communicable with electronic key 20 by means of wireless communication.

At step S36, on-vehicle apparatus 1 checks for a predetermined time period whether receiver 12 receives the key ID from electronic key 20 through antenna 12a. When the key ID signal is received, the routine proceeds to step S37. When receiver 12 does not receive the key ID within the predetermined time period, the routine proceeds to step S38 of FIG. 10.

At step S37 following to the affirmative decision at step S36, unlock and lock controller 13 of on-vehicle apparatus 1 checks whether the key ID sent from electronic key 20 corresponds with the registered apparatus ID. When the key ID sent from electronic key 20 corresponds with the registered ID stored in memory 11b, the routine proceeds to step S27. When the key ID does not correspond with the registered apparatus ID, the routine proceeds to step S38. That is, when on-vehicle apparatus 1 cannot communicate with electronic key 20 (corresponding to the negative decision at step S36), or when the key ID does not correspond with the registered apparatus ID (corresponding to the negative decision at step S37), on-vehicle apparatus 1 decides that the vehicle passenger does not have electronic key 20.

At step S38, on-vehicle apparatus 1 sets a counter value N at 3. At step S39, on-vehicle apparatus 1 unlocks both doors 40 and 43 through door lock actuator 14 by the controlling unlock and lock controller 13.

At step S40, on-vehicle apparatus 1 decides whether both of door lock condition switch 10a of driver door 40 and door lock condition switch 10b of assistant door 43 are put in ON state or not. That is, on-vehicle apparatus 1 decides whether both of door lock mechanisms for driver door 40 and assistant door 43 are put in the unlock condition, the routine proceeds to step S41. When driver door 40 or assistant door 43 is put in the lock condition, the routine proceeds to step S42 wherein counter value N is decremented by 1 (N=N−1).

At step S43 following to step S42, on-vehicle apparatus 1 decides whether counter value N is equal to 0 or not. When N=0, the routine proceeds to step S41. When N≠0, the routine returns to step S39 to repeat the unlock operation. That is, in order to certainly unlock doors 40 and 43, the door unlock operation is repeated at most three times by executing these steps S38, S39, S40, S42 and S43.

At step S41 after doors 40 and 43 are certainly unlocked, on-vehicle apparatus 1 warns the vehicle occupant that electronic key 20 was mislaid in the vehicle by operating buzzer 17.

Figure 11:
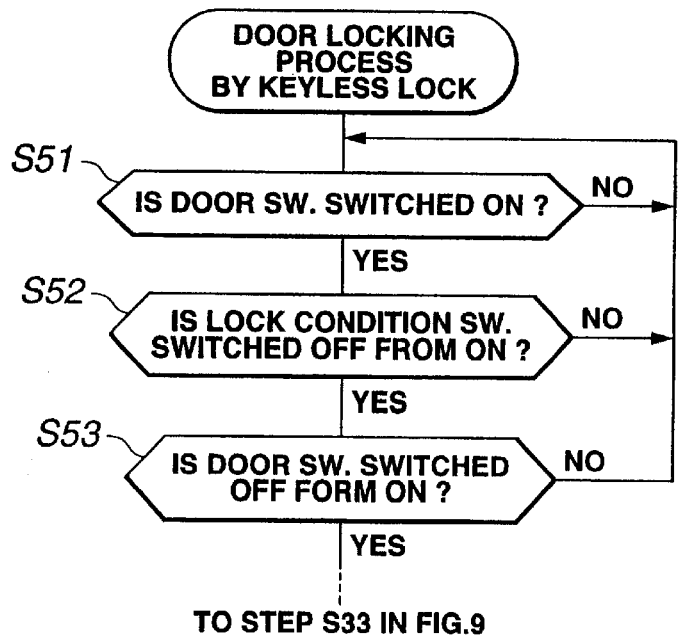
FIG. 11 is a flowchart showing a modification of the keyless lock detecting method shown by steps S31 and S32 of FIG. 9A.

With reference to FIG. 11, a modification of the second embodiment will be discussed. This modification provides another detecting method of the keyless lock instead of the operation shown by steps S31 and S32 in FIG. 9A. Since the operations except for steps S51 to S53 in this modification are completely the same as those of the second embodiment shown in FIGS. 9A, 9B and 10, the operations following to the affirmative decision of step S53 are omitted herein, and only steps S51, S52 and S53 will be discussed.

At step S51, on-vehicle apparatus 1 decides whether one of door handle switches 8a and 8b is put in ON condition or not. That is, on-vehicle apparatus 1 decides whether one of driver door 40 and assistant door 43 is opened. When one of driver door 40 and assistant door 43 is opened, the routine proceeds to step S52. When the decision at step S51 is negative, the step S51 is repeated.

At step S52, on-vehicle apparatus 1 decides whether one of door lock condition switch 10a of driver door 40 and door lock condition switch 10b of assistant door 43 is switched off from the ON state or not. That is, on-vehicle apparatus 1 decides whether one of door lock mechanisms for driver door 40 and assistant door 43 is switched from the unlock condition to the lock condition. When the decision at step S51 is affirmative, the routine proceeds to step S52. When the decision at step S51 is negative, the routine returns to step S51.

At step S53, on-vehicle apparatus 1 decides whether one of door handle switch 8a of driver door 40 and door handle switch 8b of assistant door 43 has been just switched off from ON state. That is, on-vehicle apparatus 1 checks whether driver door 40 or assistant door 43 has just been closed. When the decision at step S53 is affirmative, that is, when driver door 40 or assistant door 43 is locked by means of the keyless lock, the routine proceeds to step S33 shown in FIG. 9A. When the decision at step S52 is negative, the routine returns to step S51.

With the thus arranged embodiments according to the present invention, driver-door communicable area 42 is set outside of the vehicle and near driver door 40, and assistant-door communicable area 44 is set outside of the vehicle and near assistant door 40. Further, when one of door lock switches 9a and 9b outside the vehicle is operated, on-vehicle apparatus 1 decides that the locking operation of driver door 40 or assistant door 43 was executed, and communicates with electronic key 20 by means of wireless communication. When it is impossible that on-vehicle apparatus 1 communicates with electronic key 20, on-vehicle apparatus 1 decides that electronic key 20 is mislaid in the passenger compartment and generates alarm to warn the mislay of electronic key 20. Further, when on-vehicle apparatus 1 is communicable with electronic key but when the key ID of electronic key 20 does not correspond with the apparatus ID registered in on-vehicle apparatus 1, there is a possibility that the driver used another key instead of electronic key 20 to lock doors 40 and 43 while mislaying electronic key 20 in the passenger compartment. Therefore, in this situation, on-vehicle apparatus 1 generates alarm.

Accordingly, the thus arranged electronic key system according to the embodiments of the present invention is capable of firmly preventing electronic key 20 from being mislaid in the passenger compartment by providing a wireless communication device having a small communicable area at the driver door or both of driver door and assistant door. This arrangement enables decreasing a cost of the electronic key system and decreasing electric power consumption of a battery.

The entire contents of Japanese Patent Applications Nos. 2000-100970 and 2000-100971 filed on Apr. 3, 2000 and Nos. 2001-66264 and 2001-66265 filed on Mar. 9, 2001 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An electronic key system for a vehicle comprising:
    a portable apparatus comprising a first wireless communication device and a first memory storing a key ID (Identification Data); and
    an on-vehicle apparatus installed in the vehicle, said on-vehicle apparatus comprising,
        a second wireless communication device communicable with the first wireless communication device when the first wireless communication device is in a predetermined area outside of the vehicle,
        a second memory storing an apparatus ID,
        a door condition detector detecting that a locking operation of the vehicle door is executed from the outside of the vehicle, and
        a control unit permitting locking the vehicle door when the key ID corresponds with the apparatus ID, the control unit outputting alarm when the locking operation of the vehicle door is executed from the outside of the vehicle and when the second wireless communication device is not capable of communicating with the first wireless communicating device.

2. The electronic key system as claimed in claim 1, wherein the control unit receives the key ID from said portable apparatus when said on-vehicle apparatus is communicable with said portable apparatus through the first and second wireless communication devices, the control unit outputting alarm when the key ID does not correspond with the apparatus ID.

3. The electronic key system as claimed in claim 1, wherein the door condition detector comprises a door lock switch which is installed at an outside portion of the vehicle door.

4. The electronic key system as claimed in claim 1, wherein the door condition detector comprises a door open-condition detector for detecting whether the vehicle door is open and a door lock-condition detector for detecting whether the vehicle door is locked, the door condition detector detecting a first condition that the vehicle door is open and locked, the door condition detector detecting a second condition that the vehicle door is closed after the door condition detector detected the first condition, the door condition detector deciding that the locking operation of the vehicle door is executed from the outside of the vehicle when the door condition detector detects the second condition.

5. The electronic key system as claimed in claim 1, wherein the door condition detector comprises a door open-condition detector for detecting whether the vehicle door is open and a door lock-condition detector for detecting whether the vehicle door is locked, the door condition detector detecting a third-condition that a lock condition of the vehicle door is switched from an unlock state to a lock state when the vehicle door is open, the door condition detector detecting a fourth condition that the vehicle door is closed after the door condition detector detected the third condition, the door condition detector deciding that the locking operation of the vehicle door is executed from the outside of the vehicle when the door condition detector detects the fourth condition.

6. The electronic key system as claimed in claim 1, wherein the control unit is communicable with said portable apparatus via the first and second wireless communication devices when said portable apparatus is in the predetermined area.

7. The electronic key system as claimed in claim 1, wherein the control unit receives the key ID stored in the first memory via the first and second wireless communication devices and checks whether the key D corresponds with the apparatus ID stored in the second memory.

8. The electronic key system as claimed in claim 1, wherein the control unit comprises an unlock and lock controller for unlocking and locking the vehicle door by controlling a door lock actuator connected to the unlock and lock controller, the control unit locking and unlocking the vehicle door by sending a lock/unlock signal to the unlock and lock controller.

9. The electronic key system as claimed in claim 1, wherein the control unit executes an unlocking operation of the vehicle door the several times until the door lock-condition detector detects the vehicle door is locked.

10. An electronic key system for a vehicle comprising:

an electronic key; and an on-vehicle apparatus installed in the vehicle, said on-vehicle apparatus being communicable with said electronic key when an electronic key is in a predetermined area outside of the vehicle, said on-vehicle apparatus detecting whether a locking operation of the vehicle door is executed from the outside of the vehicle, said on-vehicle apparatus outputting alarm when the vehicle door is locked from the outside of the vehicle and when said on-vehicle apparatus is not capable of communicating with said electronic key.

11. A method for warning mislaying an electronic key in a passenger compartment in a vehicle, the method comprising:

communicating an on-vehicle apparatus with an electronic key when the electronic key is in a predetermined area outside of the vehicle;

detecting whether a locking operation of a vehicle door is executed from the outside of the vehicle; and outputting alarm when the vehicle door is locked from the outside of the vehicle and when said on-vehicle apparatus does not communicates with said electronic key.

* * * * *